Patented Feb. 27, 1951

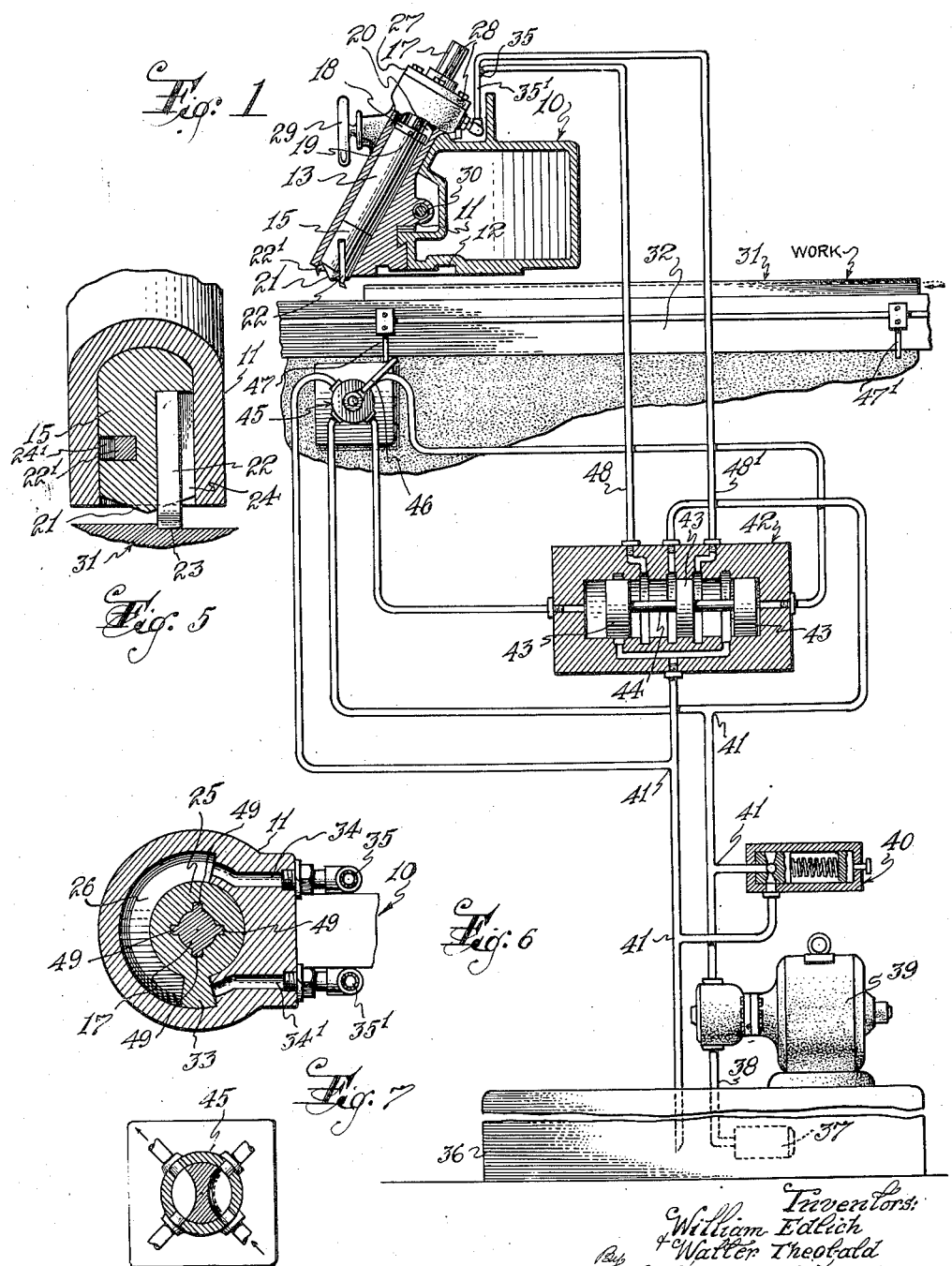

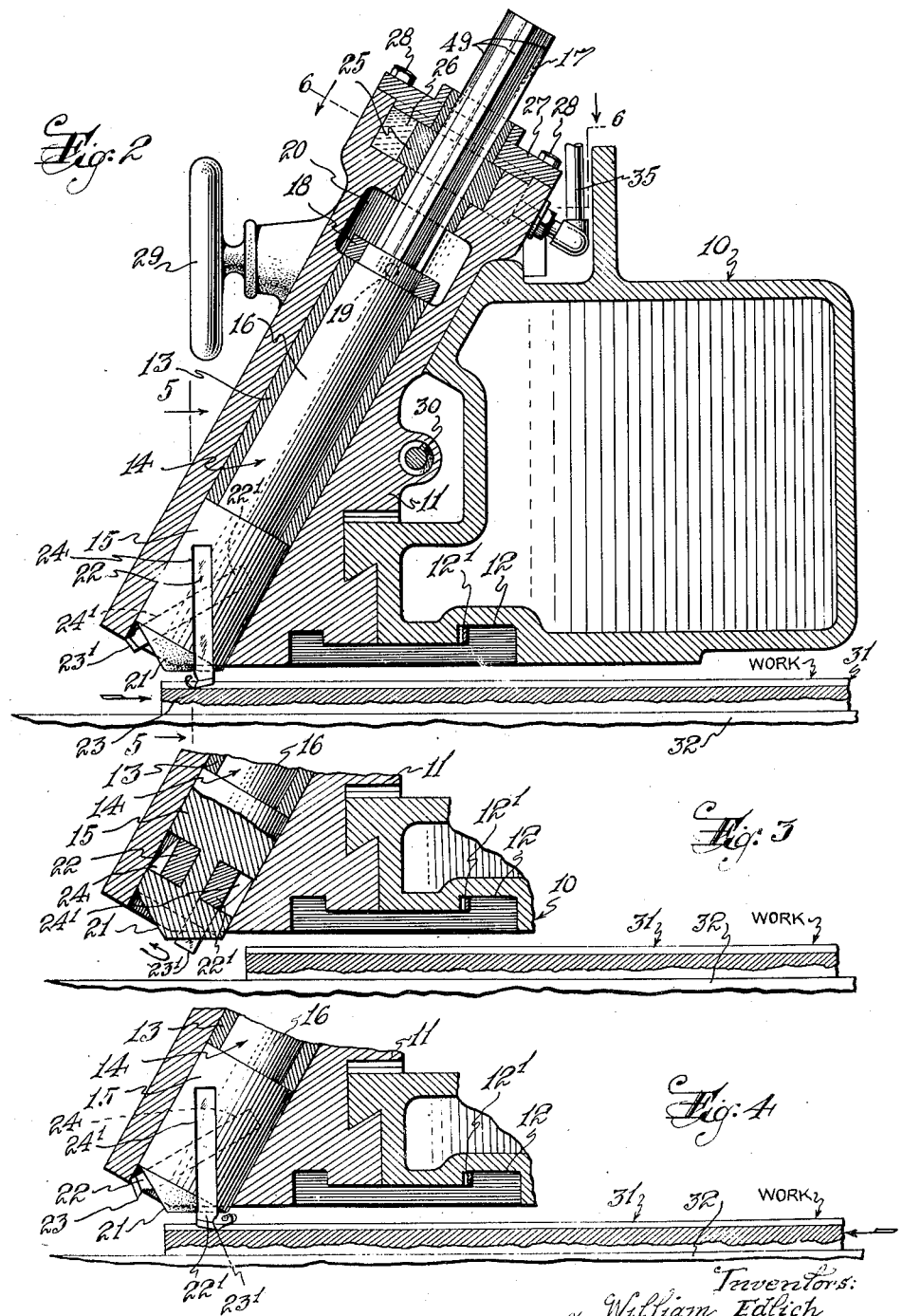

2,543,661

UNITED STATES PATENT OFFICE 2,543,661

TOOLHOLDER

William Edlich, Dover, N. J., and Walter Theobald, Siegen, Germany; said Theobald assignor to said Edlich Application December 17, 1948, Serial No. 65,928

3 Claims. (Cl. 29—97)

This invention relates to full-tooling cycle systems for planers and the like, and more especially to such systems having a plurality of cutting tools adapted to be employed in connection with the conventional tooling, grinding, positioning and servicing practices.

Normally, planers and other metal working machines have tool-holders and cutting tools which are operative during only one cycle of the two-cycle reciprocating action, for example, during the forward travel of the work. The time required for the work to negotiate the reverse or rearward travel is thus lost time and furthermore represents not only non-productive time but a waste of energy, as obviously it involves energy to move the work. In order to reduce the non-productive time it has been suggested to speed up the reverse cycle, but while this reduces the lost time it does not eliminate it and moreover the reduction in time is realized at the expense of a considerable amount of energy—and hence is costly.

In view of the foregoing considerations efforts have been made to eliminate the lost time by providing for cutting or tooling during both the forward and rearward travels. Thus, for example, movable cutter arrangements have been suggested as one means of solving the problem. However, the suggested solutions which have come to our knowledge are subject to various objections. For one thing, where a single cutter is employed, it can be employed only when specially ground and then only when the cutting edge is parallel to the work piece. If the cutter has two cutting edges, one employed for the forward travel and the other for the reverse travel, special adjustment devices are required to place each cutting edge in proper operating position.

An object of this invention is substantially to eliminate the non-productive period in reciprocating metal working machines such as planers by a simple and easy-to-operate and -maintain apparatus. A further object is to utilize conventional tool cutters in conventional positions and with conventional grinding operations, positioning and servicing practices.

Other objects of our present invention will become apparent from the following detailed description, taken in connection with the accompanying drawings which form a part hereof and in which like characters designate corresponding parts throughout.

In the drawings:

Fig. 1 is a semi-diagrammatic view of a preferred embodiment of our novel offset duplex reversing tool-holder and one means for imparting limited rotating motion thereto;

Fig. 2 is an enlarged vertical section through the tool-holder and associated parts shown in Fig. 1, the tool-holder having been rotated 180° from the position shown in Fig. 1;

Fig. 3 is a fragmentary vertical section of the lower part of the tool-holder of Fig. 2, the tool-holder having been rotated about 90° from the position shown in Fig. 2;

Fig. 4 is a view similar to Fig. 3 except that the tool-holder is shown after having been rotated 180° from the position shown in Fig. 2;

Fig. 5 is a sectional view taken aproximately on the line 5—5 of Fig. 2;

Fig. 6 is a sectional view taken approximately on the line 6—6 of Fig. 2; and

Fig. 7 is a sectional view of the four-way valve as used in connection with one form of operation of our apparatus.

Referring to the drawings, cross-rails 10 are mounted onto a planer by conventional means (not shown). A saddle slide 11 engages with the cross-rails 10. To reduce shocks on the tool-holder system incident to reversing the motion of the work, U-rails 12 and pressure adjustment bar 12' are provided as shown. Located within the saddle is cyclindrical bushing 13. The tool-holder, generally depicted as 14, consists of a base portion 15, a shank 16 and stem 17. The tool-holder 14 is rotatably mounted within the saddle 11 but is prevented from downward or upward motion in the saddle 11 by means of collar 18 attached to tool-holder stem 17 by means of set screw 19. The collar 18 is situated within well 20. The base 15 of the tool-holder has a cone-shaped bottom 21. Located within slots 24 and 24' in the base 15 are cutters 22 and 22' having cutting edges 23 and 23', respectively.

Above the well 20 is collar valve 25 which is rigidly united by means of splines 49 to the tool-holder stem 17. Between the collar valve 25 and the upper part of saddle 11 is a chamber 26. Top plate 27 is secured to the saddle 11 by means of bolts 28.

In order to permit manual adjustment of the saddle and tool-holder assembly, adjustment wheel 29 is provided. Worm 30 permits of automatic side adjustment of the assembly. The work 31 and bed plate or work table 32 are positioned as is usual in planers and machine tools generally.

The tool-holder 14 may be rotated to a predetermined limited degree by any suitable means which may be either mechanical, electrical or hydraulic. While it is understood that our invention is not to be limited to any such particular means a preferred method of conducting the limited rotation is shown semi-diagrammatically in Fig. 1.

It will be noted in Fig. 6 that the lug 33 is shown sealing the chamber 26 from conduit 34' which leads to port 35' but conduit 34 which leads to port 35 is in operative relation with the chamber 26. The action of the means diagrammatically shown in Fig. 1 is to cause a fluid such as oil to flow through ports 35 and 35' alternately in timed relation, the lug 33 acting as a stop element when it comes in contact with conduit 34 or 34'.

The particular automatic oil control means depicted comprises a supply tank 36 having an intake filter 37, outlet pipe 38, motor pump 39, pressure relief 40, T-joints 41, piston chamber 42, piston heads 43, piston 44, four-way valve 45, valve arm 46, pipe 48 leading to port 35 and pipe 48' leading to port 35'. Since the construction and operation of such devices are well-known it is deemed unnecessary to explain the details of the same. It is only believed necessary to point out that the valve arm 46, which determines whether the flow will be in through port 35 or port 35' is itself actuated by tripper fingers 47 and 47'.

The operation of my novel tool-holder unit for full-tooling cycle systems for planers and the like will now be described.

The cutters 22 and 22' are placed in slots 24 and 24', respectively, and locked into position by means of set screws, not shown in the drawings. The tool-holder 14 is locked into position on a conventional saddle slide 11 carried by the usual cross-rails 10. With the various parts of the planer in the positions as semi-diagrammatically shown in Fig. 1, the electrical or other switch (not shown) which actuates the work and tool-holding rotating means is turned "on." The work begins its motion towards the left and cutter 22' with cutting edge 23' takes its "bite." As the work approaches the end of its left or forward travel, the tripper finger 47' engages valve arm 46 causing it to move to the left. This movement of the arm 46 in turn actuates the four-way valve 45 and as a result the oil or other suitable fluid employed ceases to flow from pipe 48 into port 35 and instead flows from pipe 48' into port 35' and thence into conduit 34'. When the oil impinges against lug 33 it causes the collar valve 25 to move clockwise (see Fig. 6) until lug 33 comes to rest against conduit 34, thereby sealing the latter conduit from chamber 26. This clockwise motion of the collar valve 25 causes the tool-holder 14 together with cutters 22 and 22' also to move clockwise, since the collar valve 25 is integrally united to the stem 17 of the tool-holder (see Fig. 6).

The extent of the clockwise motion is 180° or a half-circle. At the termination of this motion cutter 22 faces the direction shown in Fig. 2, which shows the relative position of the cutter 22 and the work 31 towards the end of the right or reverse travel.

As the work 31 approaches the end of its reverse or right travel the tripper finger 47 engages valve arm 46 and causes it to move to the right and come to the position shown in Fig. 1. This motion of the arm 46 actuates four-way valve 45 which in turn causes the automatic fluid supply means to cease flowing into port 35' via pipe 48' and causes the fluid flow to go into port 35 via pipe 48. Lug 33 is forced counter-clockwise until it comes to rest against conduit 34' sealing the latter from operating contact with chamber 26.

The counter-clockwise motion of the lug 33 causes the tool-holder 14 to move counter-clockwise also and when lug 33 comes to rest, cutter 22' is in position to take its "bite" of the work, as shown in Fig. 1.

It will be understood that the aforementioned angular motions of the tool-holder assembly takes place rapidly and while the work is not in cutting position. In the fraction of a second that it takes the work to come to rest after passing cutting position and begin its return travel, the aforementioned angular motions of the tool-holder assembly are effected, thereby reducing to a practicable minimum the lost time normally experienced in machine cutting and tooling operations.

That the cutters embodied in our device clear the work at all times except when actually performing their cutting operations may be seen from Figs. 2, 3 and 4. It will be seen from Fig. 2 that the work 31 has just about completed its reverse travel, to the right. Cutter 22 is in cutting position and cutter 22' is out of the cutting area, and indeed is so far from the cutting area that there is no danger of "burring" or other undesirable effects. Fig. 3 shows the relative positions of cutters 22 and 22' when the tool-holder assembly has traversed 90° of its counter-clockwise motion. It will be seen that both of the cutters 22 and 22' are out of the cutting or "burring" areas. Not until the 180° angular motion has been completed (Fig. 4) is either cutter in position to cut and that cutter, 22' is in the desired position. When the clockwise motion of the tool-holder assembly is effected the two cutters are likewise out of the way of the work 31 from the time cutter 22' has completed its "bite" until the cutter 22 is in position to begin its "bite."

Those skilled in the art will perceive that the present invention has practical advantages arising from the simplicity of the apparatus and from the fact that our invention can be utilized without any special techniques or equipment, but instead by using well-known and standard parts and practices. It will be observed that the cutter position and edges are the usual ones. The invention is therefore not to be restricted to any particular cutting edges. The position of the cutters when in operating relation with reference to the work is the conventional 90° upright, that is to say, the operating cutter is not only 90° from the plane of the work 31 in one direction (as can be seen from Fig. 1) but is on a 90° plumb line to the work plane. (See Fig. 5.)

While the invention has been described in detail as to construction and arrangement of parts, it is understood that some modifications may be made without departing from our invention, and hence no limitations are intended other than those imposed by the scope of the appended claims construed as broadly as permissible in view of the prior art.

We claim:

1. A tool holder having a central axis and being suitable for use in planers and the like, comprising a conical bottom portion, slots in said bottom portion, and two cutters having cutting edges and being operatively disposed in said slots, each cutter making a 30° angle with said central axis, the cutting edge of each cutter facing in the same direction.

2. A tool holder having a central axis and being suitable for use in planers and the like, comprising a conical bottom portion, slots in said bottom portion, and two cutters having cutting edges and being operatively disposed in said slots, each cutter making a 30° angle with said central axis.

3. A tool holder having a central axis and being suitable for use in planers and the like, comprising a conical bottom portion, slots in said bottom portion, and two cutters having cutting edges and being operatively disposed in said slots.

WILLIAM EDLICH.
WALTER THEOBALD.

REFERENCES CITED

The following references are of record in the file of this patent:

UNITED STATES PATENTS

| Number | Name | Date |
|---|---|---|
| 934,078 | Kuwada | Sept. 14, 1909 |
| 1,041,984 | Eggers | Oct. 22, 1912 |
| 2,047,052 | Benzon | July 7, 1936 |
| 2,252,655 | Young et al. | Aug. 12, 1941 |